United States Patent
Götz et al.

(10) Patent No.: US 10,630,201 B2
(45) Date of Patent: Apr. 21, 2020

(54) MODULE FOR A MULTILEVEL CONVERTER

(71) Applicant: Dr. Ing. h.c. F. Porsche Aktiengesellschaft, Stuttgart (DE)

(72) Inventors: Stefan Götz, Forstern (DE); Johannes Höß, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/091,646

(22) PCT Filed: Dec. 14, 2016

(86) PCT No.: PCT/EP2016/025177
§ 371 (c)(1),
(2) Date: Oct. 5, 2018

(87) PCT Pub. No.: WO2017/174102
PCT Pub. Date: Oct. 12, 2017

(65) Prior Publication Data
US 2019/0157985 A1      May 23, 2019

(30) Foreign Application Priority Data
Apr. 7, 2016  (DE) .......... 10 2016 106 359

(51) Int. Cl.
*H02M 7/483* (2007.01)
*H02M 7/00* (2006.01)
*H02P 27/06* (2006.01)

(52) U.S. Cl.
CPC .......... *H02M 7/483* (2013.01); *H02M 7/003* (2013.01); *H02P 27/06* (2013.01); *H02M 2007/4835* (2013.01)

(58) Field of Classification Search
CPC ...... H02M 7/00; H02M 7/483; H02M 7/5387; H02P 27/06
See application file for complete search history.

(56) References Cited

U.S. PATENT DOCUMENTS 6,005,787 A * 12/1999 Mizukoshi ............ H02M 7/483
307/44
9,024,561 B2    5/2015 Lawrence et al.
(Continued)

FOREIGN PATENT DOCUMENTS

CN     101656434 A     2/2010
CN     101938127 A     1/2011
(Continued)

OTHER PUBLICATIONS

International Search Report and Written Opinion for International Application No. PCT/EP2016/025177, dated Apr. 5, 2017—9 pages.
(Continued)

*Primary Examiner* — Eduardo Colon Santana
*Assistant Examiner* — Said Bouziane
(74) *Attorney, Agent, or Firm* — RatnerPrestia

(57) ABSTRACT

A module configured as a component of a multilevel converter has a plurality of basic units and electrical energy sources. Each basic unit has at least one half-bridge. The at least one half-bridge includes at least one high-side switch and at least one low-side switch. Two basic units are arranged directly adjacent alongside one another within the module. A first basic unit is connected to a positive pole of a first energy source and the at least one low-side switch is connected to a negative pole of a second energy source. A second basic unit is connected to a positive pole of the second energy source and the at least one low-side switch is
(Continued)

connected to a negative pole of the first energy source. Current is transported between two poles via at least one current path.

15 Claims, 9 Drawing Sheets

(56) References Cited

U.S. PATENT DOCUMENTS

| | | | |
|---|---|---|---|
| 9,496,799 B2* | 11/2016 | Goetz | H02M 3/158 |
| 9,869,728 B2* | 1/2018 | Baek | G01R 31/40 |
| 10,008,411 B2* | 6/2018 | Bayerer | H01L 23/66 |
| 2013/0033912 A1 | 2/2013 | Wu et al. | |
| 2014/0002002 A1* | 1/2014 | Barza | B25F 5/00 |
| | | | 318/724 |
| 2014/0211520 A1* | 7/2014 | Zhang | H02M 1/126 |
| | | | 363/37 |
| 2015/0009734 A1 | 1/2015 | Stahl et al. | |
| 2015/0236634 A1* | 8/2015 | Han | H02P 5/74 |
| | | | 318/504 |
| 2015/0280474 A1 | 10/2015 | Lunghard et al. | |
| 2015/0372611 A1 | 12/2015 | Hiller | |
| 2016/0118922 A1* | 4/2016 | Rauscher | B60L 50/51 |
| | | | 318/139 |
| 2018/0041135 A1* | 2/2018 | Onishi | H02M 7/49 |
| 2018/0138826 A1* | 5/2018 | Jimichi | H02M 1/32 |

FOREIGN PATENT DOCUMENTS

| | | |
|---|---|---|
| CN | 103780171 A | 5/2014 |
| DE | 202013104146 U1 | 9/2013 |
| DE | 102013106265 A1 | 12/2014 |
| EP | 2713394 A1 | 4/2014 |
| EP | 2722978 A2 | 4/2014 |
| EP | 2765602 A1 | 8/2014 |
| JP | 2001045772 A1 | 2/2001 |
| JP | 2006025518 A1 | 1/2006 |
| WO | 2012079213 A1 | 6/2012 |
| WO | 2013001740 A1 | 1/2013 |
| WO | 2015131931 A1 | 9/2015 |
| WO | 2016034232 A1 | 3/2016 |

OTHER PUBLICATIONS

Chinese Office Action with Search Report for Chinese Application No. 201680084313.7, dated Dec. 4, 2019 with translation, 11 pages.

* cited by examiner

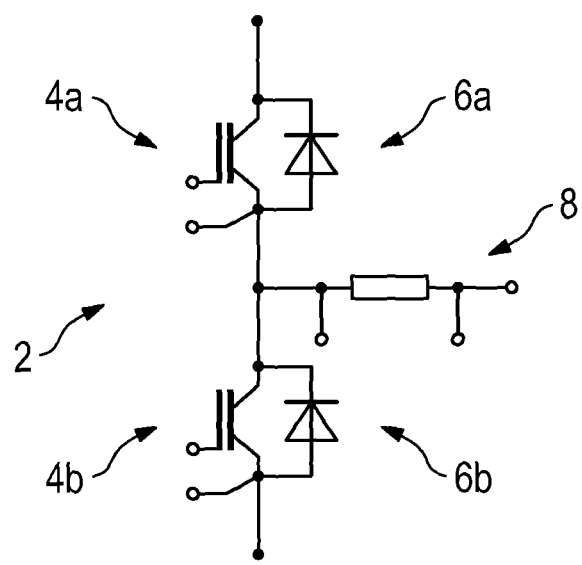
Prior Art  Fig. 1a
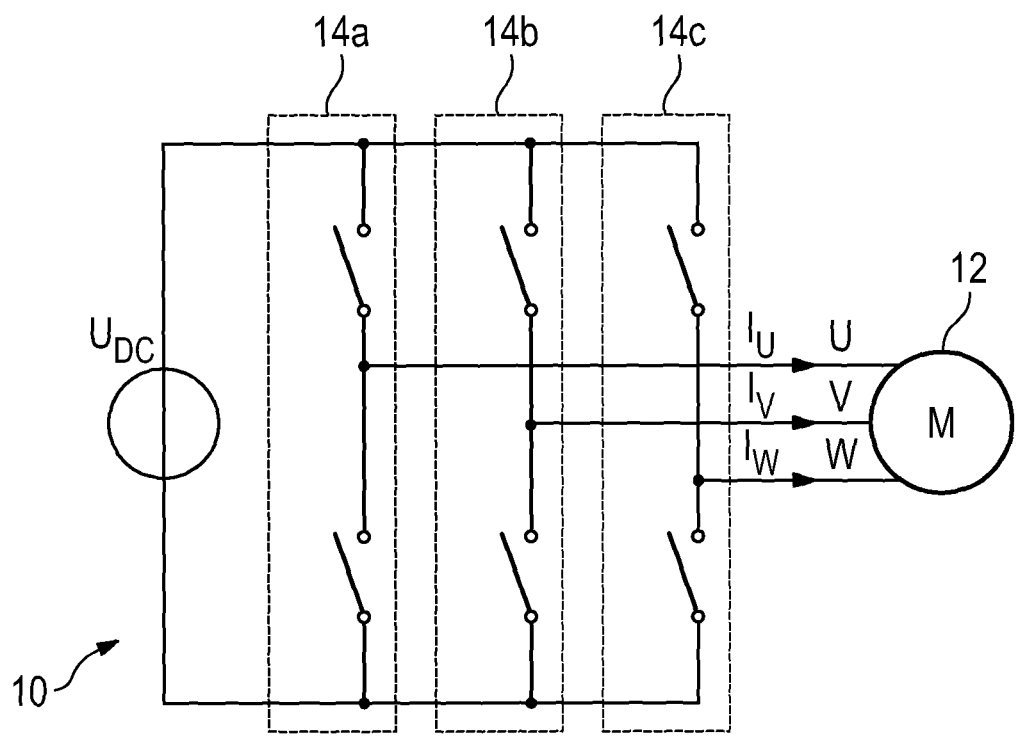
Prior Art  Fig. 1b

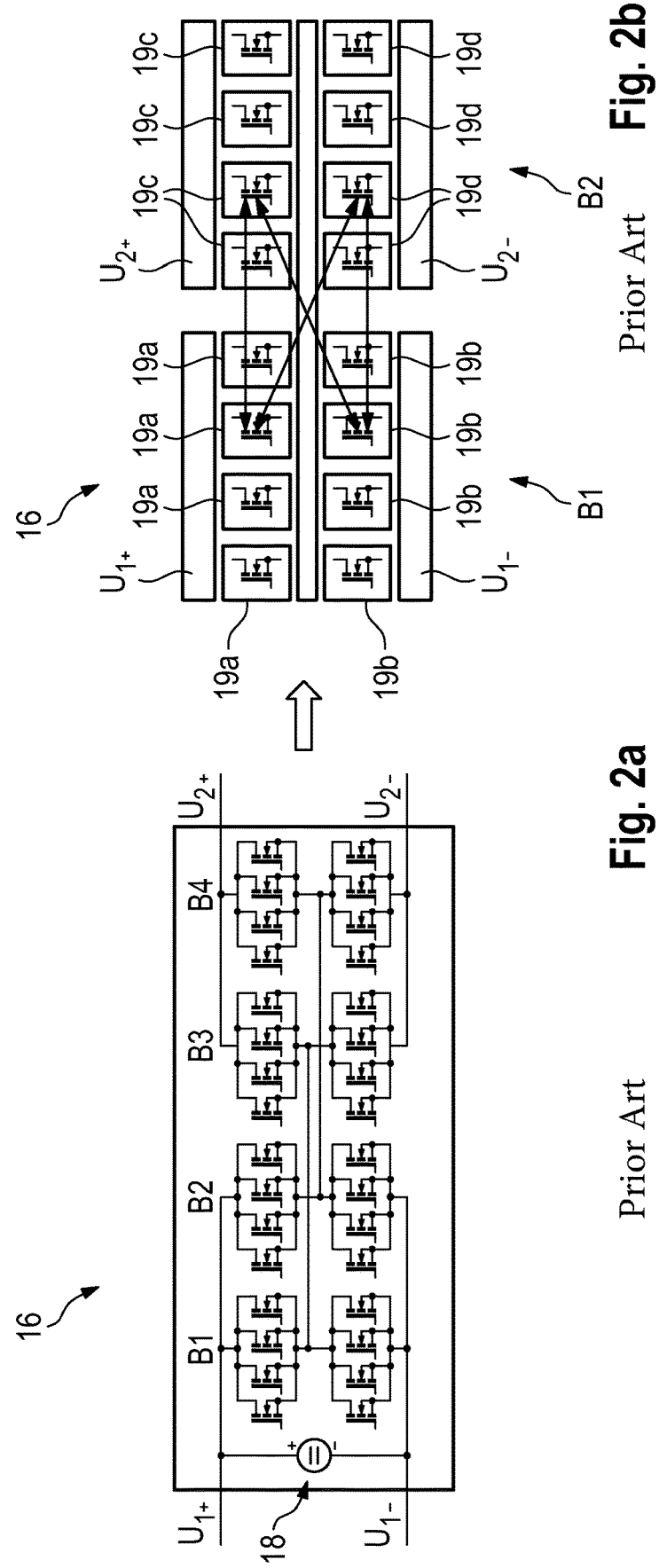

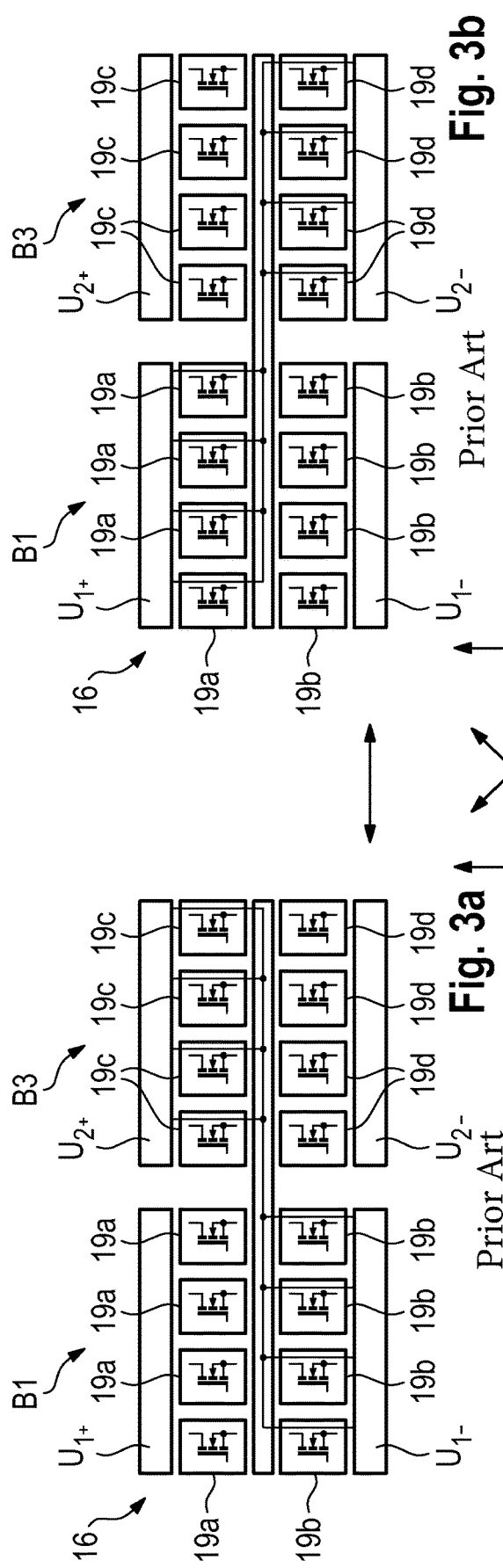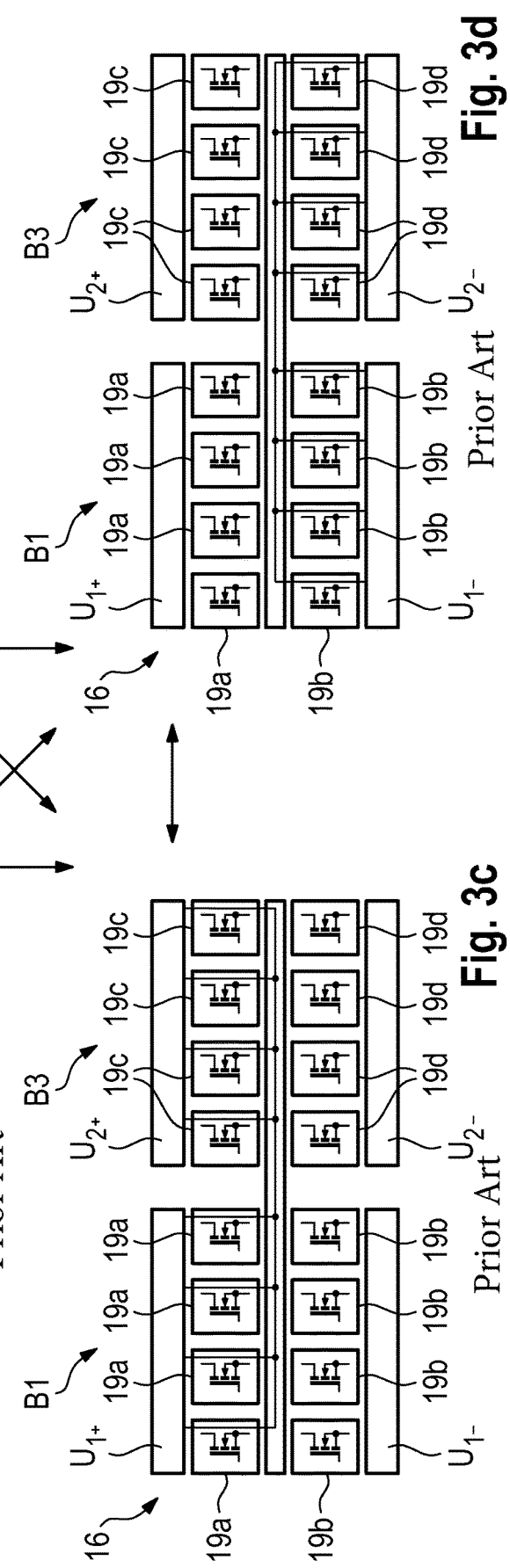

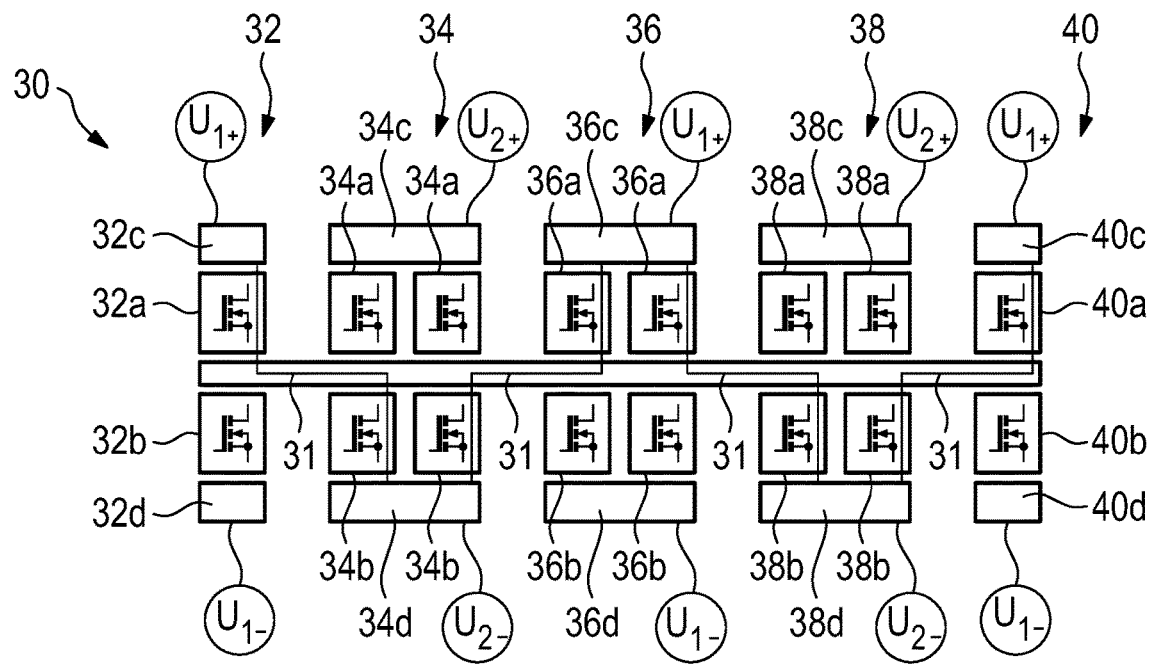
Fig. 5a
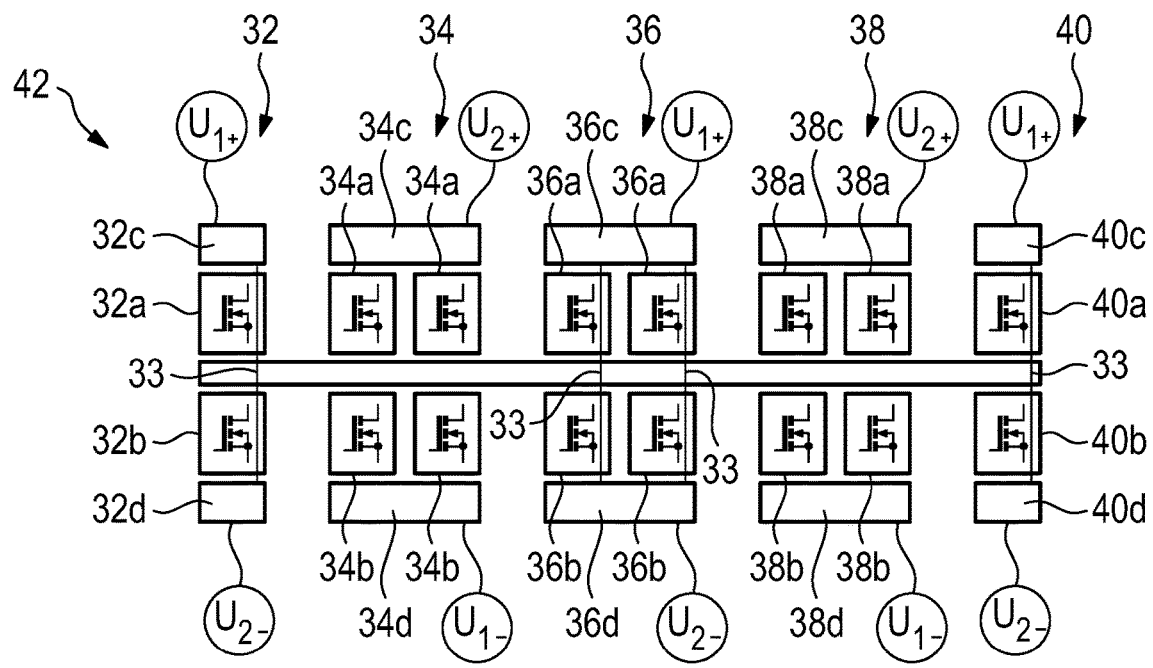
Fig. 5b

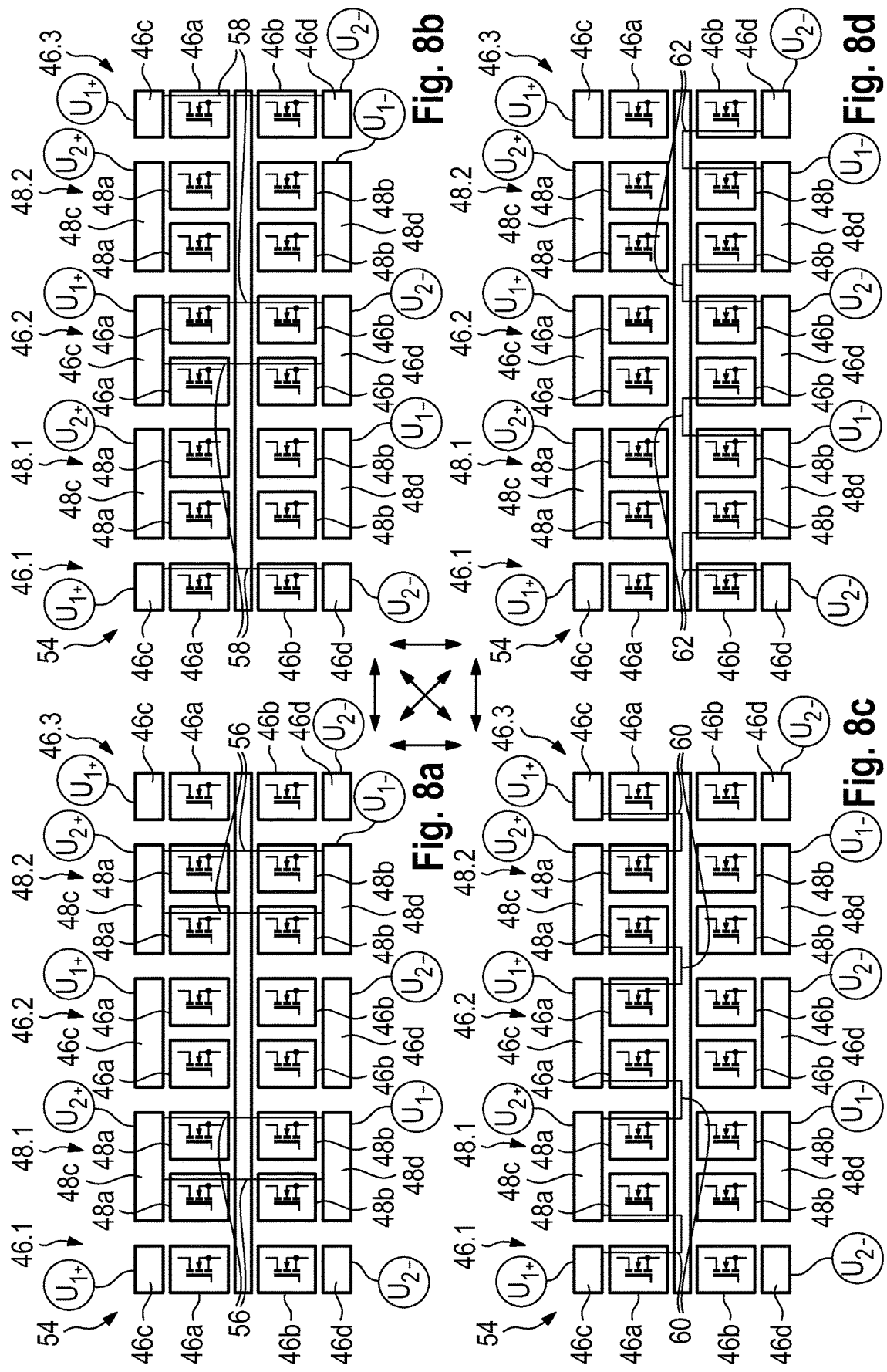

MODULE FOR A MULTILEVEL CONVERTER

CROSS-REFERENCE TO RELATED APPLICATION

This U.S. national phase patent application claims priority to PCT International Patent Application No. PCT/EP2016/025177, filed Dec. 14, 2016, which claims priority to German Patent Application No. DE 102016106359.2, filed Apr. 7, 2016, the contents of each application being incorporated by reference herein in its entirety.

FIELD OF THE INVENTION

The invention relates to a module configured as a component of a multilevel converter, to a multilevel converter and to a method for operating a multilevel converter.

BACKGROUND OF THE INVENTION

A multilevel converter is an electrical device comprising multiple modules designed in the same manner, each module having an associated voltage source of its own. During operation of the multilevel converter, multiple modules are combined with one another, a respective required resultant voltage being able to be produced from voltage sources of combined modules.

The document US 2013 0033 912 A1, which is incorporated by reference herein, describes a five-level converter having a capacitor set comprising two capacitors and two diodes, a switch and a full-bridge circuit. It is therefore possible for an AC voltage having precisely five voltage levels to be produced in this case.

The document US 2015 0009 734 A1, which is incorporated by reference herein, describes a method for controlling a mulitlevel half-bridge. The multilevel half-bridge in this case consists of two branches arranged symmetrically about a center tap and having an arbitrary number of switches. These switches are each connected to the corresponding switch of the other branch via a capacitor.

The document US 2015 0280 474 A1, which is incorporated by reference herein, describes a method for charging an energy storage device from a three-phase AC current source. In this case, each phase of the AC current source is connected to a step-down converter, a diode and a converter.

The document US 2015 0372 611 A1, which is incorporated by reference herein, describes a modular high-frequency converter having multiple submodules that each have a half-bridge and a full bridge, these being connected via a DC link circuit. A voltage measurement on the capacitance present in each DC link circuit allows the individual submodules to be selectively switched on or off in this way.

The document WO 2015/131931 A1, which is incorporated by reference herein, describes a multilevel converter having multiple submodules that consist of half-bridges and are interconnected either as a half-bridge or as a full bridge.

Against this background, an example provides a multilevel converter that includes multiple modules and a method for operating the multilevel converter. Magnetic fields induced when individual modules are switched on and off are intended to be reduced. Some examples include a module, a multilevel converter, and a method.

The module according to aspects of the invention is configured as a component of a multilevel converter and has multiple base units and electrical energy sources, each base unit having at least one half-bridge. The at least one half-bridge comprises at least one highside switch and at least one lowside switch. In this case, for two base units arranged directly adjacent to one another inside the module, there is provision for a first base unit to have the at least one highside switch connected to a positive pole of a first energy source and the at least one lowside switch connected to a negative pole of a second energy source, wherein a second base unit has the least one highside switch connected to a positive pole of the second energy source and the at least one lowside switch connected to a negative pole of the first energy source. During operation of the module, current is able to be transported between two poles via at least one current path.

Normally, the at least one current path is able to be connected between at least two directly adjacent switches.

In one configuration, the at least one current path is able to be connected for transporting current directly between the at least one highside switch and the at least one lowside switch of the at least one half-bridge, wherein the at least one current path is able to be used to transport current from the positive pole of the first or second energy source via the at least one highside switch and the at least one lowside switch to the negative pole of the second or first energy source.

Alternatively or additionally, the at least one current path is able to be connected for transporting current between a switch of the first base unit and a switch of the second base unit that are arranged directly adjacent to one another. Therefore, the at least one current path is connected directly between two highside, directly adjacent switches of two directly adjacent base units and/or directly between two lowside, directly adjacent switches of two directly adjacent base units. If the at least one current path connects two directly adjacent highside switches of the two base units, the current is transported from the positive pole of the first energy source via the two highside switches to the positive pole of the second energy source. If the at least one current path connects two directly adjacent lowside switches of the two base units, the current is transported from the negative pole of the first energy source via the two lowside switches to the negative pole of the second energy source.

At least one switch of the at least one half-bridge is configured as a semiconductor switch, for example as a transistor, as a metal oxide semiconductor field effect transistor (MOSFET) and/or as an insulated gate bipolar transistor (IGBT).

Each base unit comprises a positive busbar and a negative busbar, wherein the at least one highside switch of the at least one half-bridge is connected to the positive busbar and the at least one lowside switch of the at least one half-bridge is connected to the negative busbar. The two base units arranged directly adjacent inside the module, there is provision for the first base unit to have the positive busbar connected to the positive pole of the first energy source and the negative busbar connected to the negative pole of the second energy source. Moreover, the second base unit has the positive busbar connected to the positive pole of the second energy source and the negative busbar connected to the negative pole of the first energy source.

At least one electrical energy source of the module is configured as a voltage source, normally as a DC voltage source, for example as a battery or storage battery and/or capacitor.

Moreover, the base units are arranged on a circuit board. Therefore, the base units are arranged beside one another on the circuit board. Normally, each base unit comprises a housing enclosing the switches. Switches from two directly adjacent base units arranged directly beside one another are separated from one another only by the housings of the two base units.

The multilevel converter according to aspects of the invention has multiple modules, wherein each module has multiple base units and electrical energy sources, wherein each base unit has at least one half-bridge, wherein the at least one half-bridge comprises at least one highside switch and at least one lowside switch. For two base units arranged directly adjacent to one another inside the module, there is provision for a first base unit to have the at least one highside switch connected to a positive pole of a first energy source and the at least one lowside switch connected to a negative pole of a second energy source, wherein a second base unit has the at least one highside switch connected to a positive pole of the second energy source and the at least one lowside switch connected to a negative pole of the first energy source. In this case, current is able to be transported between two poles via at least one current path.

In the multilevel converter, all of the modules are configured equally or in the same manner and/or similarly. During operation of the multilevel converter, at least one module is active. If multiple modules are active at the same time, these modules are able to be connected in series with one another or in parallel with one another. The multilevel converter is configured as an energy source for an electrical machine.

Additionally, there is provision for the multilevel converter to be arranged in an electrical energy network of a motor vehicle. The multilevel converter can be used to supply an electrical machine, for example, with electric power. The electrical machine is able to be operated as a motor and/or as a generator and being configured to drive the motor vehicle. The multilevel converter has at least one embodiment of the module.

The method according to aspects of the invention is provided for operating a multilevel converter having multiple modules as components. In this case, each module has multiple base units and electrical energy sources, wherein each base unit has at least one half-bridge, wherein the at least one half-bridge comprises at least one highside switch and at least one lowside switch. For two base units arranged directly adjacently to one another inside the module, there is provision for a first base unit of the two base units to have the at least one highside switch connected to a positive pole of a first energy source and the at least one lowside switch connected to a negative pole of a second energy source, and wherein a second base unit of the two base units has the at least one highside switch connected to a positive pole of the second energy source and the at least one lowside switch connected to a negative pole of the first energy source. Current is transported between two poles via at least one current path.

In one configuration, the at least one current path for transporting current is connected directly between the at least one highside switch and the at least one lowside switch of the at least one half-bridge, wherein the at least one current path is used to transport current from the positive pole of the first or second energy source via the at least one highside switch and the at least one lowside switch to the negative pole of the second or first energy source.

In a complementary or alternative configuration, the at least one current path for transporting current is connected directly between a switch of the first base unit and the switch of the second base unit that are arranged directly adjacent to one another. Therefore, the at least one current path is connected directly between two highside, directly adjacent switches of two directly adjacent base units and/or directly between two lowside, directly adjacent switches of two directly adjacent base units. If the at least one as current path connects two directly adjacent highside switches of the two base units, the current is transported from the positive pole of the first energy source via the two highside switches to the positive pole of the second energy source. If the at least one current path connects two directly adjacent lowside switches of the two base units, the current is transported from the negative pole of the first energy source via the two lowside switches to the negative pole of the second energy source.

Moreover, each module provides an output voltage, wherein at least two modules are connected in series with one another and/or in parallel with one another, a combined and/or resultant output voltage being provided for the multilevel converter from the output voltages of the modules combined with one another or connected in parallel and/or in series with one another.

Normally, current is transported by at least one first current path, wherein a commutation or switching of a respective module results in the at least one first current path being deactivated or switched off and at least one second current path being activated or switched on, the current being transported by the at least one second current path after the commutation.

The multilevel converter is configured for producing an AC voltage from multiple DC voltages, inter alia, and, in one configuration, comprises multiple modules connected in series, each module in turn comprising four MOSFET half-bridges and two voltage sources. Each MOSFET half-bridge has a high side and a low side comprising in each case four highside and lowside switches, for example transistors, wherein additionally two respective MOSFET half-bridges are connected to one another. Switching the current paths between the connected MOSFET half-bridges produces a required AC voltage.

In one configuration, there is provision for the various current paths connected between directly adjacent switches in a base unit or between two base units or across base units to overlap and also be short. Therefore, only low inductances build up in the event of a switching, as a result of which overvoltages are avoided and switches, for example transistors, are protected against damage. Additionally, the envisaged topology of a circuit of the multilevel converter means that the various switches, for example transistors, on one side, i.e. the highside switches or the lowside switches of a half-bridge, are loaded evenly, since there are current paths of the same or similar length for the transistors.

In the envisaged topology of the multilevel converter, the low and high sides of two connected half-bridges are interchanged with one another. Moreover, the two half-bridges are interlaced with one another. As a result of this topology, the various current paths overlap at least partially and are distinctly shortened, reducing inductances that arise during switching. Additionally, the length of the current path is also the same for each switch, which means that all subassemblies configured as switches are loaded equally.

Usually, the multilevel converter according to aspects of the invention comprises multiple modules, wherein each of these modules in turn has multiple base units and multiple energy sources, usually voltage sources, configured as batteries or capacitors. During operation of the multilevel converter, at least one of the modules is able to be activated. If multiple modules are activated, they are connected in parallel and/or in series with one another, as a result of which the multilevel converter is able to be used to provide different voltages having different maximum values and/or amplitudes as required.

Each base unit comprises multiple half-bridges, wherein in each case a highside switch and a lowside switch inside a base unit are arranged directly adjacent to one another. If the module has two voltage sources, for example, there is provision for highside switches of a first base unit to be connected to the positive pole of the first voltage source, whereas the lowside switches are connected to the negative pole of the second voltage source. Moreover, the highside switches of the second base unit are connected to the positive pole of the second voltage source and the lowside switches are connected to the negative pole of the first voltage source. In this case, these two base units are likewise arranged directly adjacent to one another.

On the basis of such a layout of the base units, comparatively short current paths arise between two switches. When switching between two operating states or in the event of a commutation of the base unit, however, only currents along short current paths are built up and dissipated again, but with only comparatively small magnetic fields being induced that impair operation of the subassemblies only slightly. The base units of the modules of the multilevel converter that are connected in series, for example, allow rapid switching of the current paths. If multiple modules and/or base units are connected in succession, it is additionally possible to provide an AC voltage from a DC voltage from voltages sources of the modules.

BRIEF DESCRIPTION OF THE DRAWING

Further advantages and configurations of the invention are obtained from the description and the accompanying drawings.

It goes without saying that the features cited above and those yet to be explained below are useable not only in the respectively indicated combination but also in other combinations or on their own, without departing from the scope of the present invention.

Figure 4:
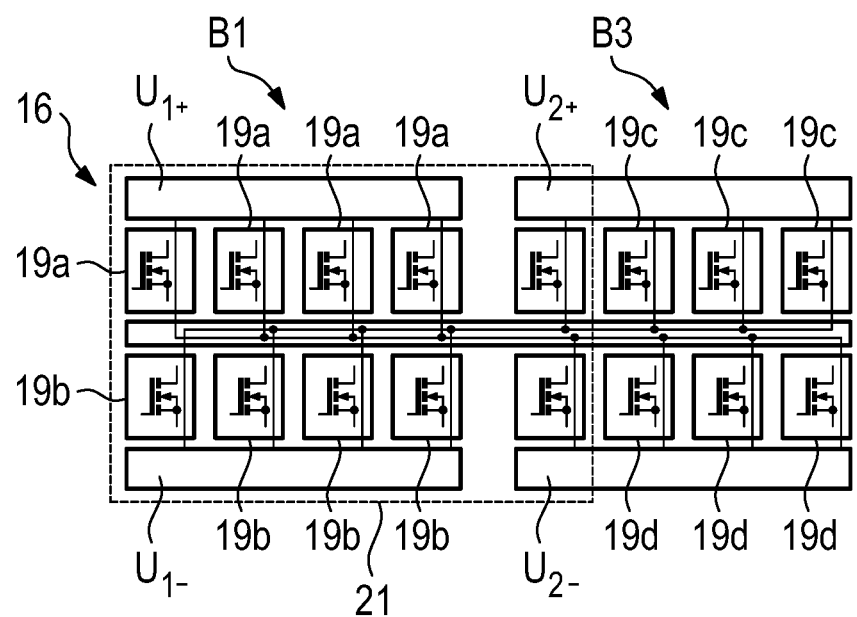

The invention is depicted schematically in the drawings on the basis of embodiments and is described schematically and in detail with reference to the drawings.

FIGS. 1A-1B show a schematic depiction of details of a multilevel converter.

FIGS. 2A-2B show a schematic depiction of first details of an example of a multilevel converter known from the prior art.

FIGS. 3A-3D show a schematic depiction of second details of the example of the multilevel converter known from the prior art.

FIG. 4 shows a schematic depiction of third details of the example of the multilevel converter known from the prior art.

FIGS. 5A-5B show a schematic depiction of a first embodiment of the module according to aspects of the invention of a first embodiment of the multilevel converter according to aspects of the invention.

Figure 6A:
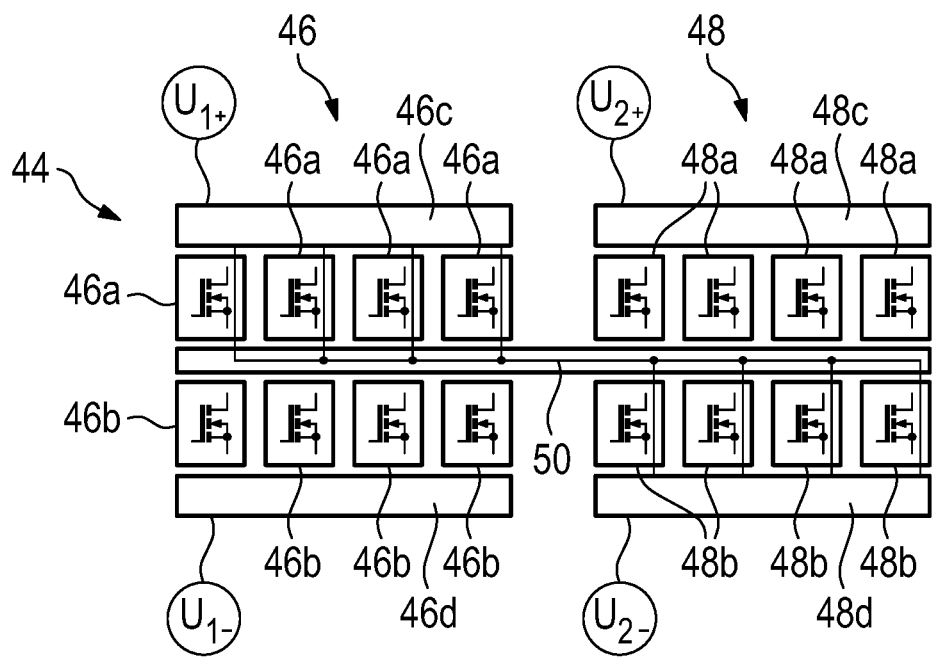
Figure 6B:
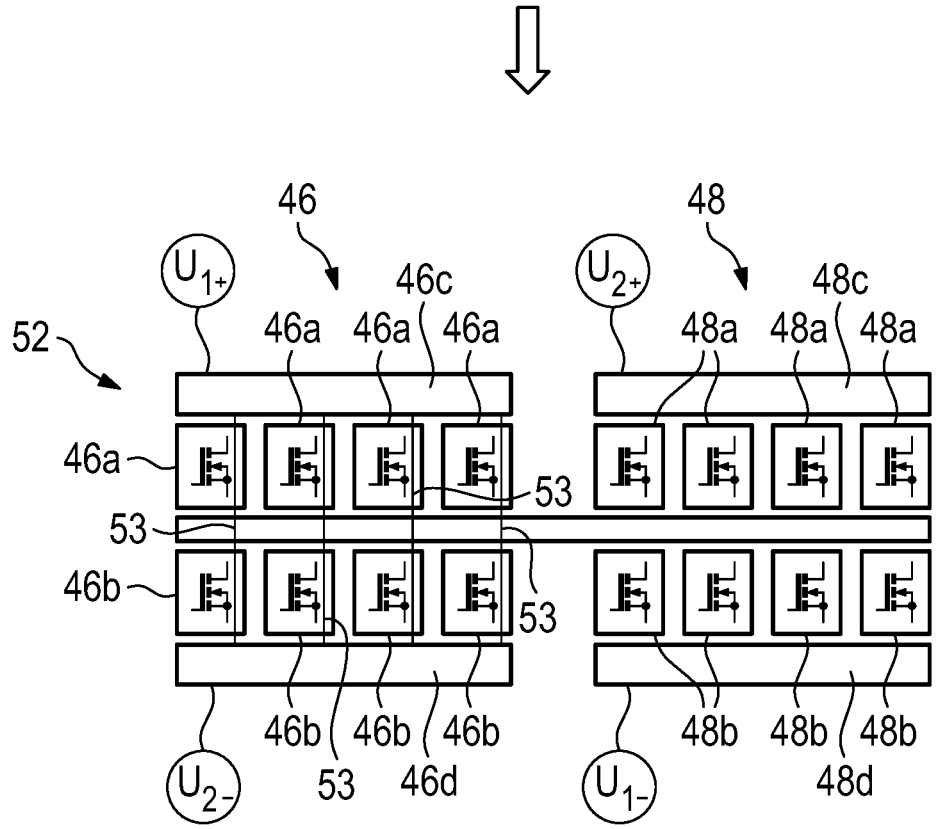

FIGS. 6A-6B show a schematic depiction of a second embodiment of the module according to aspects of the invention of a second embodiment of the multilevel converter according to aspects of the invention.

Figure 7A:
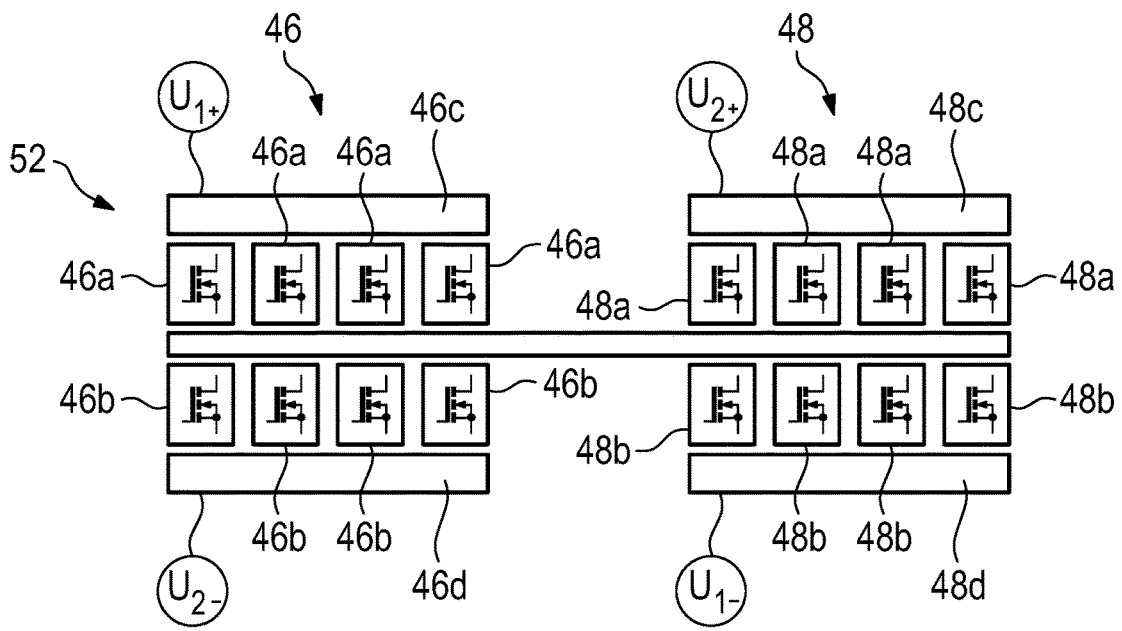
Figure 7B:
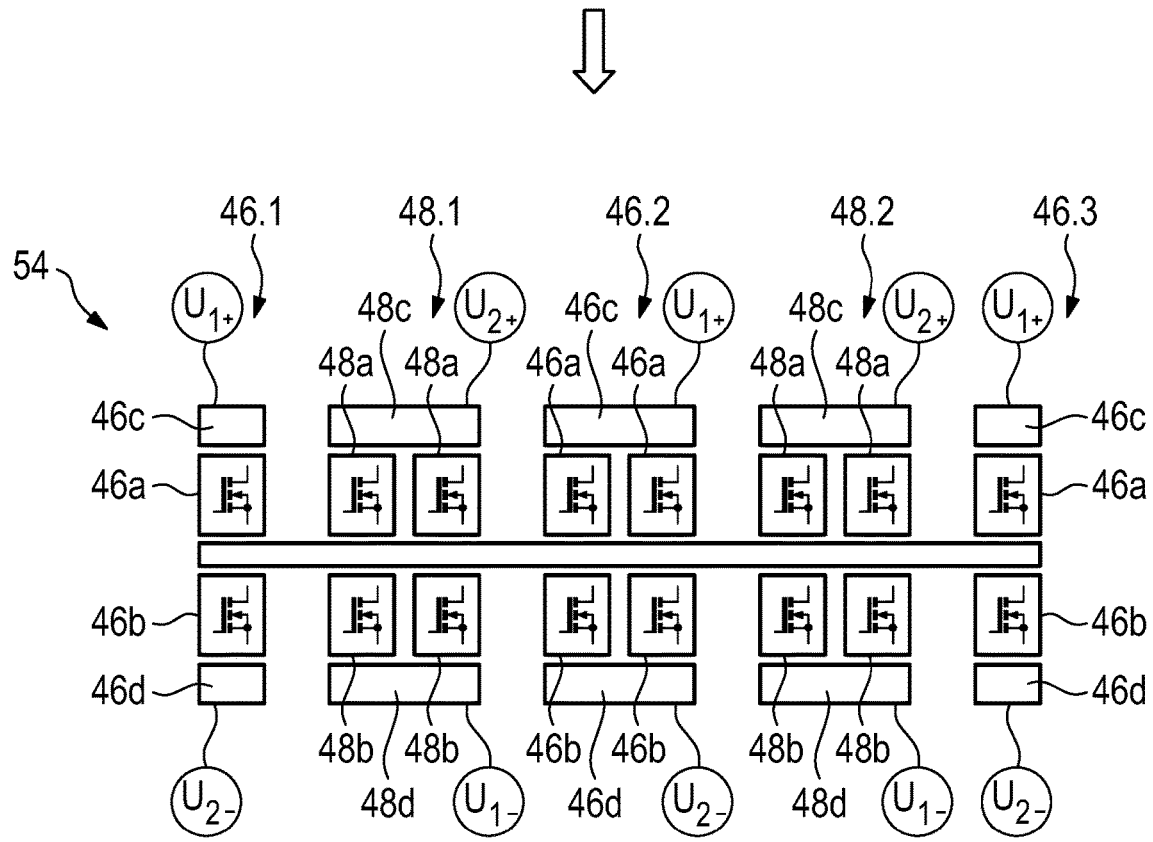

FIGS. 7A-7B show a schematic depiction of a third embodiment of the module according to aspects of the invention of a third embodiment of the multilevel converter according to aspects of the invention.

FIGS. 8A-8D show a schematic depiction of the third embodiment of the module according to aspects of the invention in different operating states.

Figure 9:
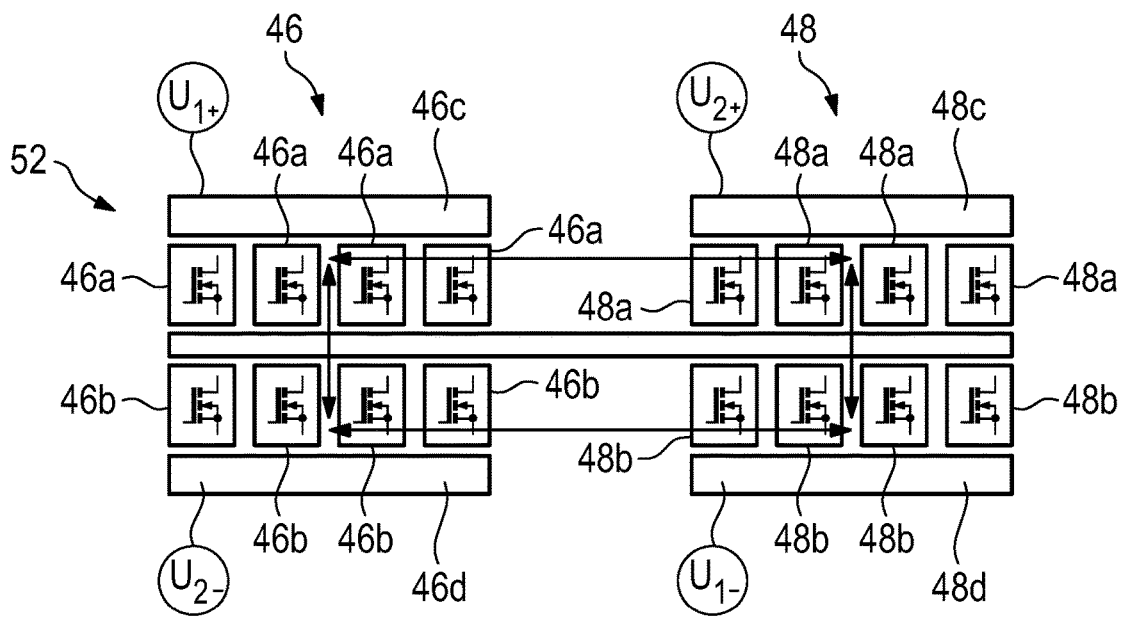

FIG. 9 shows a schematic depiction of the second embodiment of the module according to aspects of the invention in first different operating states.

Figure 10:
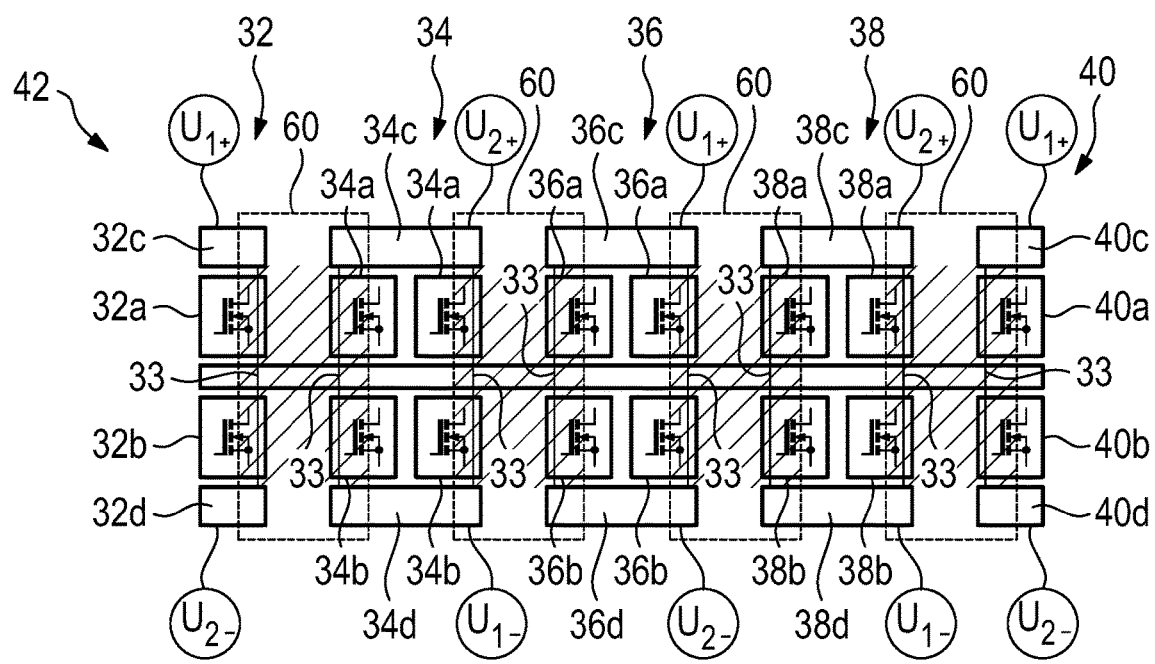

FIG. 10 shows a schematic depiction of a second embodiment of the module according to aspects of the invention in second different operating states.

DETAILED DESCRIPTION OF THE INVENTION

The figures are described coherently and generally. Identical components have the same associated reference numerals.

FIG. 1a shows a schematic depiction of an example of a half-bridge 2, as is also part of a multilevel converter according to aspects of the invention, for example, as presented below on the basis of one of FIGS. 5a to 10. However, it is also possible for a half-bridge 2 of this kind also to be configured as part of a multilevel converter from one of FIGS. 2a to 4 that is known from the prior art.

This half-bridge 2 comprises two switches 4a, 4b configured as semiconductor switches, in this case IGBTs, having one freewheeling diode 6a, 6b each and a measuring resistor 8.

An example of an inverter 10 for an electric motor 12 having three phases U, V, W is depicted schematically in FIG. 1b. This inverter 10 comprises a voltage source $U_{DC}$ and three half-bridges 14a, 14b, 14c, which can also be referred to as a B6 bridge.

A multilevel converter either according to the prior art or else according to aspects of the invention is configured to produce a, by way of example, three phase AC voltage from a DC voltage, for example for an electric drive of a motor vehicle. The multilevel converter comprises multiple modules of the same type or at least of functionally similar type and is configured to transform a voltage applied to an input, for example a DC voltage or AC voltage, into at least one voltage, i.e. one or more voltages, for example at least one AC voltage, at the output.

In this case, the modules connect inter alia a current path between multiple alternative current paths, the current in the modules in which the energy stores, for example capacitors or battery cells, are embedded flowing either in the charging direction or in the discharge direction and being routed past an energy storage device or split, with multiple energy storage devices, for example of different modules, being electrically interconnected in parallel and/or in series.

In a power electronics unit, applicable circuits, i.e. both traditional inverters and multilevel converters, are normally divided into half-bridges comprising two independent switches as a base unit and are normally also arranged together on an electronic assembly. It is possible for half-bridges of this kind also to be already integrated in a subassembly, which means that separation of the half-bridges is not possible.

FIG. 2a shows a schematic depiction of a module 16 of a multilevel converter having in this case four base units B1, B2, B3, B4 and a voltage source 18 U1, which is used to provide the base units B1 and B2 with a voltage at the potentials U1+ and U1−. The two base units B3 and B4 are provided with a voltage at the potentials U2+ and U2− by a second voltage source U2, which is not shown here. In this case, there is provision for the base units B1 and B3 to be connected to one another. Each base unit B1, B2, B3, B4 in this case comprises four half-bridges, each having four highside switches 19a, 19c and four lowside switches 19b, 19d.

Each half-bridge is capable of acting as a current divider. In this case, it is possible to provide a current path between an output and a highside connection, between an output and a lowside connection or between all connections, a short circuit being able to be brought about deliberately in the latter case.

All in all, the module 16 presented here has thirty two MOSFETs as switches, wherein each base unit B1, B2, B3, B4 comprises a MOSFET half-bridge having four highside switches 19a, 19c each and four lowside switches 19b, 19d each, the respective four highside switches and the respective four lowside switches 19a, 19c being connected in parallel with one another. During operation of the module 16, in each case four highside switches and four lowside switches of a half-bridge are switched on and off at the same time, as a result of which a current carrying capacity can be increased and a resistive loss can be kept down. Additionally, in each case two base units B1 and B2 configured as half-bridges are connected to the first voltage source 18 U1 and the two further base units B3 and B4 are connected to the second voltage source U2. Moreover, there is provision for the first and third base units B1 and B3 and the second and fourth base units B2 and B4 to be connected to one another, as a result of which the first and third base units B1 and B3 are connected in parallel with the second and fourth base units B2 and B4. During operation, the first and third base units B1 and B3 behave symmetrically with respect to the second and fourth base units B2 and B4.

In detail, FIG. 2a shows the circuit and FIG. 2b shows a typical geometric arrangement of the switches 19a, 19b, 19c, 19d on a printed circuit board. For the sake of better clarity, only the base units B1 and B3 are portrayed in FIG. 2b. The base units B2 and B4 behave identically.

Between the switches 19a, 19b, 19c, 19d of the two adjacent base units B1 and B2, there are four possible current paths, which are indicated by double-headed arrows in FIG. 2b. A flow of current from a positive first pole U1+ to a negative first pole U1− or from a positive second pole U2+ to a negative second pole U2− would mean a short circuit, and must therefore be avoided unreservedly.

A first problem in the prior art is that circuits of this kind have very high switching inductances. When current is switched between two current paths by means of a or, normally, multiple half-bridge(s) during what is known as commutation, a magnetic field of a first current path must likewise be dissipated, whereas a magnetic field of a second current path is built up. Since these magnetic fields store energy, the energy from the magnetic field of the old, first current path must accordingly first of all be converted into current in order to dissipate the magnetic field. At the same time, the current in the new, second current path must build up a corresponding magnetic field.

Only at locations at which the magnetic fields of an old and of a new current path overlap and have a similar order of magnitude is a small and rapid transfer of the energy possible. This transfer of the energy firstly requires time far longer than a duration of a switching process and possibly lasting several 10 ns to a few μs. Secondly, these currents are absolutely also driven via switches 19a, 19b, 19c, 19d that are apparently already open, which means that a voltage rises on the basis of the low capacitance and can possibly damage or destroy subassemblies.

As a remedy, switching times are normally extended enormously in the prior art so that switches 19a, 19b, 19c, 19d are not opened while a magnetic field still needs to be dissipated. Additionally, often what are known as discharge circuits, also referred to as snubbers, protective circuitry or discharge networks, are used that discharge the currents.

Both methods from the prior art produce high losses, however, because the currents flowing in this time are normally converted into heat.

FIGS. 3a, 3b, 3c and 3d depict four different commutations or circuits of the two base units B1, B2 of the module 16 of the multilevel converter. In this case, current paths are connected between the lowside switches 19b of the first base unit B1 and the highside switches 19c of the second base unit B2 in FIG. 3a. In FIG. 3b, current paths are connected between the highside switches 19a of the first base unit B1 and the lowside switches 19d of the second base unit B2. In FIG. 3c, current paths are connected between the highside switches 19a, 19c between the two base units B1 and B2. Moreover, current paths are connected between the lowside switches 19b, 19d of the two base units B1, B2 in FIG. 3d. Transitions between the commutations of the current paths are indicated by double-headed arrows between FIGS. 3a, 3b, 3c, 3d, with an inductance arising on every commutation and/or switching of the current paths.

In the layout arrangement on the circuit board that is presented here, the magnetic fields of the individual current paths have only very small overlaps. These nonoverlapping or only slightly overlapping magnetic fields are significant when changing between two current paths. In this case, the induced magnetic fields are equivalent to a size of surface areas spanned by conductor tracks through which the current paths run.

In this case, the following applies for the inductance L arising during the commutation (K) of two current paths $S_a$, $S_b$, allowing for the magnetic field constant $\mu_0$:

$$L_{K, a \leftrightarrow b} = \frac{\mu_0}{4\pi} \oiint_{a,b} \frac{<ds_a, ds_b>}{\|s_a - s_b\|}$$

Normally, single semiconductor elements and hence switches 19a, 19b, 19c, 19d are not loaded with current to the same extent. This means that the current is not split evenly over the switches 19a, 19b, 19c, 19d.

This uneven loading by the current may be static. If it is not a matter of high frequency components in the current, a different magnitude of resistance of the individual current paths is responsible therefor. The magnetic field is insignificant in this case.

If the loading by the current is also dynamic and occurs only in the event of strong current fluctuations and in particular switching processes, however, different strengths of magnetic field are induced along the current paths on the basis of the currents flowing through the individual switches 19a, 19b, 19c, 19d, in this case, semiconductor switches, this also relating to parallel current paths through the individual switches 19a, 19b, 19c, 19d, over which the current should be split evenly, however. While the inductances in the as case of large semiconductor switches consisting of a multiplicity of single semiconductors are matched to one another, the current paths interact magnetically with the current paths of adjacent half-bridges on power circuits integrated on circuit boards owing to the small distances.

During switching between current paths, energy is stored inductively that dissipates at random in the form of voltages.

In this case, the following applies for the magnetic flux □:

$$\phi = LI = \int B dA$$

Here, L is the inductance, I is a flowing current, B is the magnetic field and A is the surface area through which the magnetic field flows.

For an induced voltage $U_{ind}$, the following applies:

$$U_{ind} = \frac{d\phi}{dt} = L\frac{dI}{dt} = \frac{d}{dt}\int BdA$$

FIG. 4 indicates a commutation between the current paths shown in FIG. 3b and the current paths shown in FIG. 3a. A change in a current results in overvoltages for inductances. A crucial aspect in this case is a large surface area 21, shown in FIG. 4 in this case, that borders or encompasses the amended current paths at the switching time and in which magnetic fields are induced, resulting in high overvoltages during the switching process, since inductive energy is dissipated in an uncontrolled manner. The surface areas of magnetic fields induced by currents through the switches 19a, 19b, 19c, 19d, which are configured as MOSFETs in this case, are of different size. This results in different inductances and hence loadings during switching. The result is a shortening of the life of more heavily loaded transistors of the switches 19a, 19b, 19c, 19d. In FIG. 4, before the switching, the highside switches 19a of the first base unit B1 and the lowside switches 19d of the third base unit B3 are connected via current paths, as shown in FIG. 3b. After switching, the lowside switches 19b of the first base unit B1 and the highside switches 19c of the third base unit B3 are connected to one another via current paths, as shown in FIG. 3a. Transistors having the lowest inductance during the switching in FIG. 4 are those that are associated with the highside switches 19a of the first base unit B1 and whose current paths touch. These transistors route current first during the switching, the transistors needing to carry the whole current in this short transition phase before said current is slowly distributed over all further transistors of all switches 19a, 19b, 19c, 19d.

Additionally, there is provision for a current path never to be routed from the positive U1+ to the negative pole U1− of the first voltage source and from the positive pole U2+ to the negative pole U2− of the second voltage source U2. This property is used in the configuration of the module according to aspects of the invention, as a result of which induction surface areas spanned at a switching time are able to be reduced.

The current paths depicted in FIG. 4 for the switches 19a, 19b, 19c, 19d configured as MOSFETs are of different length, as a result of which inductances of individual current paths differ from one another. This results in the switches 19a, 19b, 19c, 19d being loaded unevenly both statically and dynamically, which is why some of the switches 19a, 19b, 19c, 19d have to carry higher currents than others and accordingly age correspondingly faster. In this case, there is provision for current paths between switches 19a, 19b, 19c, 19d that are at a great distance from one another to be longer than current paths of those switches 19a, 19b, 19c, 19d that are shorter distances from one another. However, this results in an inductance during switching increasing with the length of a respective current path.

To implement a multilevel converter according to aspects of the invention starting from the prior art shown in FIGS. 3 and 4, a field amplitude of a magnetic field of each individual current path is firstly lowered and secondly an overlap between the magnetic fields is maximized.

To provide the multilevel converter according to aspects of the invention, current paths and currents are distributed as widely as possible, with current densities falling. Alternatively or additionally, first current paths, through which currents flow in a first direction, are arranged close to second current paths, through which currents flow in the opposite direction at the same time, which compensates for magnetic fields of adjacent currents flowing in the opposite direction, reducing field amplitudes of the corresponding magnetic fields.

The overlap between the magnetic fields is achieved for currents flowing at staggered times, which therefore do not flow at the same time, because the current in one current path is diverted to a second current path, when current paths to be switched to one another through which currents flow in the same direction are close to one another, with the current being shifted to the second current path only minimally as compared with its original, first current path or riverbed. In one configuration, the two current paths even share sections, as a result of which the current on these sections does not have to change its course even during switching.

The inductance of two current paths that arises during the commutation is able to be derived in this case from a coupling inductance of conductors carrying current at the same time, for example in a transformer, and can be ascertained for a circuit. Additionally, a loading of the switches is able to be reduced when realizing a multilevel converter according to aspects of the invention starting from the prior art.

FIG. 5a shows an example of a module 30 of a multilevel converter having a first base unit 32 having a highside switch 32a, which is connected to a positive pole U1+ of a first voltage source U1 via a positive busbar 32c, and a lowside switch 32b, which is connected to a negative pole U1− of the first voltage source U1 via a negative busbar 32d. The module 30 comprises a second base unit 34 having highside switches 34a, which are connected to a positive pole U2+ of the second voltage source U2 via a positive busbar 34c, and two lowside switches 34b, which are connected to a negative pole U2− of the second voltage source U2 via a negative busbar 34d. A third base unit 36 comprises two highside switches 36a, which are connected to the positive pole U1+ of the first voltage source U1 via a positive busbar 36c, and lowside switches 36b, which are connected to the negative pole U1− of the first voltage source U1 via a negative busbar 36d. A third base unit 38 comprises two highside switches 38a, which are connected to the positive pole U2+ of the second voltage source U2 via a positive busbar 38c, and two lowside switches 38b, which are connected to a negative pole U2− of the second voltage source U2 via a negative busbar 38d. A fourth base unit 40 of the module 30 comprises a highside switch 40a, which is connected to the positive pole U1+ of the first voltage source U1 via a positive busbar 40c, and a lowside switch 40b, which is connected to the negative pole U1− of the first voltage source U1 via a negative busbar 40d.

During operation of the module 30, current flows along a first current path 31 from the first highside switch 32a of the first base unit 32 to a first lowside switch 34b (on the left) of the second base unit 34, along a second current path 31 from a second lowside switch 34b (on the right) of the second base unit 34 to a first highside switch 36a (on the left) of the third base unit 36. Moreover, current flows along a third current path 31 from a second highside switch 36a (on the right) of the third base unit 36 to a first lowside switch 38b (on the left) of the second base unit 38. Current flows along a fourth current path 31 from a second lowside switch 38b (on the right) of the third base unit 38 to a high side switch 40a of the third base unit 40.

Starting from the module 30 shown in FIG. 5a, the first embodiment of the module 42 according to aspects of the invention, shown in FIG. 5b, is able to be provided for the first embodiment of the multilevel converter according to aspects of the invention, to which end connections of the negative pole U1− of the first voltage source U1 are interchanged with connections of the negative pole U2− of the second voltage source U2 on the negative busbars 32d, 34d, 36d, 38d, 40d.

This module 42 of the multilevel converter has the highside switch 32a of the first base unit 32 connected to the positive pole U1+ of the first voltage source U1 and the applicable positive busbar 32c. By contrast, the lowside switch 32b is connected to the negative pole U2− of the second voltage source U2 via the negative busbar 32d. The second base unit 34 has the highside switches 34a connected to the positive pole U2+ of the second voltage source U2 and the applicable positive busbar 34c, whereas the two lowside switches 34b are connected to the negative pole U1− of the first voltage source U1 and the applicable negative busbar 34d. In FIG. 5b, the third base unit 36 has the highside switches 36a connected to the positive pole U1+ of the first voltage source U1 and the applicable positive busbar 36c. The lowside switches 36b are connected to the negative pole U2− of the second voltage source U2 and the applicable negative busbar 36d, however. The two highside switches 38a of the third base unit 38 are connected to the positive pole U2+ of the second voltage source U2 and the applicable positive busbar 38c. The two lowside switches 38b are connected to the negative pole U1− of the first voltage source U1 and the applicable negative busbar 38d. The highside switch 40a of the fourth base unit 40 is connected to the positive pole U1+ of the first voltage source U1 and the applicable positive busbar 40c. However, in this case the lowside switch 40b is connected to the negative pole U2− of the second voltage source U2 and the applicable negative busbar 40d. In each base unit 32, 34, 36, 38, 40, in each case one highside switch 32a, 34a, 38a, 40a and one lowside switch 32b, 34b, 36b, 38b, 40b, which are directly adjacent, form a respective half-bridge.

During operation of the module 40, current now flows along shortened current paths 33 within a respective base unit 32, 36, 40, namely between the positive pole U1+ and the negative pole U2− along a first current path 33 from the highside switch 32a to the lowside switch 32b of the first base unit 32. In the third base unit 36, a second current path 33 extends from the first highside switch 36a (on the left) to the first lowside switch 36b (on the left). A third current path 33 likewise runs inside the third base unit 36 from the second highside switch 36a (on the right) to the second lowside switch 36b (on the right). In this case, these two current paths connect the positive pole U1+ to the negative pole U2−. Moreover, a fourth current path 33 in the fifth base unit 40 is routed from the highside switch 40a to the lowside switch 40b and likewise connects the positive pole U1+ to the negative pole U2−.

Therefore, the long, diagonal current paths 13 (FIG. 5a) are replaced by short, direct current paths 33 (FIG. 5b).

FIG. 6a shows a schematic depiction of an example of a module 44 of a multilevel converter having a first base unit 46 having in this case four high switches 46a, which are connected to a positive pole U1+ of a first voltage source U1 via a positive busbar 46c, and four lowside switches 46b, which are connected to a negative pole U1+ of the first voltage source U1 via a negative busbar 46d. The module 44 moreover comprises a second base unit 48 having four highside switches 48a, which are connected to a positive pole U2+ of the second voltage source U2 via a positive busbar 48c, and four lowside switches 48b, which are connected to a negative pole U2− of the second voltage source U2 via a negative busbar 48d.

During operation of the module 44, current flows via current paths 50 from the highside switches 46a of the first base unit 46 to the lowside switches 48b of the second base unit 48.

Starting from the module 44 shown in FIG. 6a, the second embodiment of the module 52 according to aspects of the invention, shown in FIG. 6b, is able to be provided for the second embodiment of the multilevel converter according to aspects of the invention, to which end connections of the negative pole U1− of the first voltage source U1 are interchanged with connections of the negative pole U2− of the second voltage source U2.

This module 52 of the multilevel converter has the highside switches 46a of the first base unit 46 connected to the positive pole U1+ of the first voltage source U1 via the positive busbar 46c. By contrast, the lowside switches 46b are connected to the negative pole U2− of the second voltage source U2 via the negative busbar 46d. The second base unit 48 has the highside switches 48a connected to the positive pole U2+ of the second voltage source U2 via the positive busbar 48c, whereas the lowside switches 48b are connected to the negative pole U1− of the first voltage source U1 via the negative busbar 48d.

Moreover, in each case one highside switch 46a, 48a and one lowside switch 46b, 48b, which are directly adjacent inside a base unit 46, 48, form a half-bridge. The switches 46a, 46b, 48a, 48b are configured as semiconductor switches, for example transistors or IGBTs (insulated gate bipolar transistors).

During operation of the module 52, current flow only along four shortened current paths 53 inside the first base unit 46 from a highside switch 46 to a directly adjacent lowside switch 46b, a respective current path 53 running between the two switches 46a, 46b of a half-bridge of the respective base unit 46.

By interchanging the two negative poles U1− and U2− on the negative busbars 46d, 48d, the long, diagonal current paths 50 (FIG. 6a) from the positive pole U1+ of the first voltage source U1 to the negative pole U2− of the second voltage source are replaced by the distinctly shorter current paths 53 (FIG. 6b). In the case of the module 52, long diagonal current paths between the positive pole U1+ and the negative pole U1− or between the positive pole U2+ and the negative pole U2−, and accordingly current paths between the two base units 46, 48, will usually not arise, since this would be consistent with a short circuit.

The second embodiment of the module 52 according to aspects of the invention from FIG. 6b is also shown in FIG. 7a without current paths 53. On the basis that, a third embodiment of the module 54 according to aspects of the invention is able to be provided for a third embodiment of the multilevel converter according to aspects of the invention. In this case, the first base unit 46 is split into three first base units 46.1, 46.2, 46.3, the highside switches 46a of the three first base units 46.1, 46.2, 46.3 being connected to the positive pole U1+ of the first voltage source U1 via the positive busbar 46c. The lowside switches 46b of the three first base units 46.1, 46.2, 46.3 are connected to the negative pole U2− of the second voltage source 42 via the negative busbars 46d. The second base unit 48 is split into two second base units 48.1, 48.2. In this case, the highside switches 48a of the two second base units 48.1, 48.2 are connected to the positive pole U2+ of the second voltage source via the positive busbars 48c and the lowside switches 48b of the two second base units 48.1, 48.2 are connected to the negative pole U2− of the second voltage source via the negative busbars 48d.

On a circuit board of the module 54, the first first base unit 46.1, the first second base unit 48.1, the second first base unit 46.2, the second second base unit 48.2 and the third first base unit 46.3 are in each case arranged beside one another. This embodiment of the module 54 for the multilevel converter is also consistent, from the point of view of design and functionally, with the example shown in FIG. 5b for the module 42 for the first embodiment of the multilevel converter, with base unit 32 consistent with base unit 46.1, base unit 34 consistent with base unit 48.1, base unit 36 consistent with base unit 46.2, base unit 38 consistent with base unit 48.2 and base unit 40 consistent with base unit 46.3.

Therefore, the original base units 46, 48 have in each case been split into individual base units 46.1, 46.2, 46.3, 48.1, 48.2, as a result of which current paths between the switches 46a, 46b, 48a, 48b are shortened and magnetic fields arising as a result of changing currents during commutations are reduced. The splitting of the original base units 46, 48 into individual base units 46.1, 46.2, 46.3, 48.1, 48.2 in each case can also be referred to as interlacing of the switches 46a, 46b, 48a, 48b of the half-bridges with one another.

Therefore, beside a highside switch 46a of a first base unit 46.1, 46.2, 46.3 connected to the positive pole U1+ of the first voltage source U1 there is in each case arranged a directly adjacent highside switch 48a of a second base unit 48.1, 48.2 connected to the positive pole U2+ of the second voltage source U2. Moreover, beside a lowside switch 46b of a first base unit 46.1, 46.2, 46.3 connected to the negative pole U2− of the second voltage source U2 there is in each case arranged a directly adjacent lowside switch 48b of a second base unit 48.1, 48.2 connected to the negative pole U1− of the first voltage source U1.

The third embodiment of the module 54 is likewise depicted schematically in each case in one of FIGS. 8a, 8b, 8c and 8d in different commutations or operating states. In the case of a first commutation (FIG. 8a), current paths 56 run in each case only between highside switches 48a and lowside switches 48b that are directly adjacent in the second base units 48.1, 48.2 and form a half-bridge. In the case of a second commutation (FIG. 8b), current paths 58 run in each case only between highside switches 46a and lowside switches 46b that are directly adjacent in the first base units 46.1, 46.2, 46.3 and form a respective half-bridge. In the case of a third commutation (FIG. 8c), current paths 60 run between a highside switch 46a of a first base unit 46.1, 46.2, 46.3 and the directly adjacent highside switch 48a of a directly adjacent second base unit 48.1, 48.2. In the case of a fourth commutation (FIG. 8d), current paths 62 run between a lowside switch 46b of a first base unit 46.1, 46.2, 46.3 and the directly adjacent lowside switch 48b of a directly adjacent second base unit 48.1, 48.2.

Therefore, all the depicted commutations involve current paths 56, 58, 60, 62 extending between two directly adjacent switches 46a, 46b, 48a, 48b of a respective half-bridge. In the case of the two first commutations from FIGS. 8a and 8b, the current paths 56, 58 run between a high side and a lowside switch 46a, 46b, 48a, 48b in each case inside a base unit 46.1, 46.2, 46.3, 48.1, 48.2. In the case of the third and fourth commutations from FIGS. 8c and 8d, the current paths 60, 62 run between two directly adjacent base units 46.1, 46.2, 46.3, 48.1, 48.2 either between directly adjacent highside switches 46a, 48a or between two directly adjacent lowside switches 46b, 48b. As indicated by the double-headed arrows between FIGS. 8a, 8b, 8c and 8d, it is possible to switch between two respective commutations arbitrarily. When switching between two commutations, all of the switches 46a, 46b, 48a, 48b experience the same inductance.

The module 52 already presented on the basis of FIG. 6b is additionally also depicted schematically in FIG. 9. Moreover, reference is made once again to FIG. 2b, in which current paths between individual switches 19a, 19b, 19c, 19d are indicated by double-headed arrows. By contrast, in the case of the module 52 depicted in FIG. 9 for the second embodiment of the multilevel converter, negative busbars and hence connections to the two negative poles U1− and U2− between the two base units 46, 48 are interchanged. As a result, the shortened current paths indicated by double-headed arrows in FIG. 9 are able to be provided. In this case, a value of magnetic fields induced during switching also falls as the current paths are shortened.

FIG. 10 depicts the example of the module 42 for the first embodiment of the multilevel converter according to aspects of the invention from FIG. 5b once again. In this case, FIG. 10 shows that a current path 33 runs directly between in each case one highside switch 32a, 34a, 36a, 38a, 40a and the directly adjacent lowside switch 32b, 34b, 36b, 38b, 40b, which each form a half-bridge of a base unit 32, 34, 36, 38, 40. On the basis of the interlacing and/or interchange of the negative poles U1−, U2−, switching results in only small spanned surface areas 60 with low inductance. All in all, all the possible switching variants or commutations result in a current path 33 running between two directly adjacent switches 32a, 32b, 34a, 34b, 36a, 36b, 38a, 38b, 40a, 40b of a half-bridge, i.e. as between in each case one highside switch 32a, 34a, 36a, 38a, 40a and one lowside switch 32b, 34b, 36b, 38b, 40b. This minimizes a change in the surface areas 60 of the current paths 33 over time. Moreover, all of the current paths 33 for all of the interconnected switches 32a, 32b, 34a, 34b, 36a, 36b, 38a, 38b, 40a, 40b configured as MOSFETs are of the same length, which means that all of the switches 32a, 32b, 34a, 34b, 36a, 36b, 38a, 38b, 40a, 40b are inductively loaded equally during switching. Additionally, all of the current paths 33 are of the same length and, in contrast to the prior art, do not have different lengths, which is why all of the switches 32a, 32b, 34a, 34b, 36a, 36b, 38a, 38b, 40a, 40b are loaded in the same way during switching.

The invention claimed is:

1. A module configured as a component of a multilevel converter and having multiple base units and electrical energy sources, wherein:

each base unit has at least one half-bridge;

the at least one half-bridge comprises at least one highside switch and at least one lowside switch;

for two base units, arranged directly adjacent to one another inside the module, a first base unit of the two base units has the at least one highside switch connected to a positive pole of a first energy source and the at least one lowside switch connected to a negative pole of a second energy source; and a second base unit of the two base units has the at least one highside switch connected to a positive pole of the second energy source and the at least one lowside switch connected to a negative pole of the first energy source, current being able to be transported between two poles via at least one current path.

2. The module of claim 1, wherein the at least one current path is able to be connected between at least two directly adjacent switches.

3. The module of claim 1, wherein at least one switch of the at least one half-bridge is configured as a semiconductor switch.

4. The module of claim 1, wherein each base unit comprises a positive busbar and a negative busbar, wherein the at least one highside switch of the at least one half-bridge is connected to the positive busbar and the at least one lowside switch of the at least one half-bridge is connected to the negative.

5. The module of claim 1, wherein at least one electrical energy source is configured as a voltage source.

6. The module of claim 1, wherein the base units are arranged on a circuit board.

7. A multilevel converter having multiple modules, the multilevel converter comprising:
   each module has multiple base units and electrical energy sources;
   each base unit has at least one half-bridge;
   the at least one half-bridge comprises at least one highside switch and at least one lowside switch;
   for two base units arranged directly adjacent to one another inside the module, a first base unit of the two base units has the at least one highside switch connected to a positive pole of a first energy source and the at least one lowside switch connected to a negative pole of a second energy source; and
   a second base unit of the two base units has the at least one highside switch connected to a positive pole of the second energy source and the at least one lowside switch connected to a negative pole of the first energy source, current being able to be transported between two poles via at least one current path.

8. The multilevel converter of claim 7, wherein all of the modules are configured equally.

9. The multilevel converter of claim 7, wherein the multilevel converter is configured as an energy source for an electrical machine.

10. The multilevel converter of claim 7, wherein the multilevel converter is arranged in an electrical energy network of a motor vehicle.

11. A method for operating a multilevel converter having multiple modules as components, wherein:
    each module has multiple base units and electrical energy sources;
    each base unit has at least one half-bridge, wherein the at least one half-bridge comprises at least one highside switch and at least one lowside switch;
    for two base units arranged directly adjacent to one another inside the module, a first base unit of the two base units has the at least one highside switch connected to a positive pole of a first energy source and the at least one lowside switch connected to a negative pole of a second energy source; and
    a second base unit of the two base units has the at least one highside switch connected to a positive pole of the second energy source and the at least one lowside switch connected to a negative pole of the first energy source, current being transported between two poles via at least one current path.

12. The method of claim 11, wherein the at least one current path for transporting current is connected directly between the at least one highside switch and the at least one lowside switch of the at least one half-bridge.

13. The method of claim 11, wherein the at least one current path for transporting current is connected directly between a switch of the first base unit and a switch of the second base unit that are arranged directly adjacent to one another.

14. The method of claim 11, wherein:
    each module provides an output voltage; and
    at least two modules are connected in series with one another or in parallel with one another, a resultant output voltage being provided for the multilevel converter from the output voltages of the modules connected in parallel or in series with one another.

15. The method of claim 11, wherein:
    current is transported by at least one first current path; and
    a commutation of a respective module results in the at least one first current path being deactivated and at least one second current path being activated, the current being transported by the at least one second current path after the commutation.

* * * * *